(12) United States Patent
Bodin et al.

(10) Patent No.: US 11,851,105 B2
(45) Date of Patent: Dec. 26, 2023

(54) CORNER PATCH

(71) Applicant: Autotech Engineering S.L., Bizkaia (ES)

(72) Inventors: Hans Bodin, Södra Sunderbyn (SE); Martin Holmberg, Luleå (SE); Joakim Johansson, Luleå (SE); Sofia Naystrӧm, Jӧnkoping (SE)

(73) Assignee: Autotech Engineering S.L., Amorebieta Etxano (ES)

( * ) Notice: Subject to any disclaimer, the term of this patent is extended or adjusted under 35 U.S.C. 154(b) by 127 days.

(21) Appl. No.: 17/608,788

(22) PCT Filed: Feb. 18, 2020

(86) PCT No.: PCT/EP2020/054242
§ 371 (c)(1),
(2) Date: Nov. 4, 2021

(87) PCT Pub. No.: WO2020/224819
PCT Pub. Date: Nov. 12, 2020

(65) Prior Publication Data
US 2022/0315119 A1    Oct. 6, 2022

(30) Foreign Application Priority Data

May 7, 2019 (SE) .................................. 1950545-2

(51) Int. Cl.
*B62D 25/04* (2006.01)
*B62D 27/02* (2006.01)
(Continued)

(52) U.S. Cl.
CPC .............. *B62D 25/04* (2013.01); *B60J 5/042* (2013.01); *B62D 27/023* (2013.01); *B62D 29/005* (2013.01)

(58) Field of Classification Search
CPC ...... B62D 25/04; B62D 27/023; B62D 27/02; B62D 29/001; B62D 29/004; B60J 5/00
(Continued)

(56) References Cited

U.S. PATENT DOCUMENTS 9,744,997 B2 * 8/2017 Olofsson ................. C22C 38/00
2014/0145469 A1  5/2014 Mildner et al.
(Continued)

FOREIGN PATENT DOCUMENTS

CN    102407881 A    4/2012
CN    104349968 A    2/2015
(Continued)

*Primary Examiner* — Dennis H Pedder
(74) *Attorney, Agent, or Firm* — BLANK ROME LLP

(57) ABSTRACT

The present application relates to a reinforcement element (30) arranged to be attached to a profile (10) for forming a B-pillar for a vehicle, which profile (10) is arranged with attachment areas (22, 24) for door hinges, characterised in that the reinforcement element (30) is designed with two elongated strips (32, 34) of material, wherein the strips (32, 34) are inter-connected at least at one attachment area (22) for door hinges when the reinforcement element (30) is attached to profile (10), wherein the profile (10) is hat-shaped with a central flange (12) and two sides (14, 6), and wherein each strip (32, 34) is attached to the transition area (36, 38) between the central flange (12) and a side (14, 16). The present application also 10 relates to a B-pillar provided with the reinforcement element as well as a method of manufacturing a B-pillar with the reinforcement element.

11 Claims, 6 Drawing Sheets

(51) Int. Cl.
*B60J 5/04* (2006.01)
*B62D 29/00* (2006.01)

(58) Field of Classification Search
USPC .......................... 296/193.06, 29, 30, 146.11
See application file for complete search history.

(56) References Cited

U.S. PATENT DOCUMENTS

| | | |
|---|---|---|
| 2015/0115654 A1 | 4/2015 | Honda |
| 2015/0210320 A1 | 7/2015 | Olofsson et al. |
| 2017/0349216 A1 | 12/2017 | Akhlaque-E-Rasul et al. |
| 2018/0065681 A1 | 3/2018 | Steffens et al. |
| 2018/0251160 A1 | 9/2018 | Hamada et al. |

FOREIGN PATENT DOCUMENTS

| | | | |
|---|---|---|---|
| DE | 10 2012 023 653 A1 | 5/2014 | |
| DE | 102013017269 A1 * | 8/2014 | ............. B62D 25/04 |
| DE | 10 2016 116 787 B3 | 10/2017 | |
| EP | 0 953 495 A2 | 11/1999 | |
| EP | 953495 A2 * | 11/1999 | ............. B62D 25/04 |
| EP | 2 617 509 A1 | 7/2013 | |
| EP | 3 037 328 A1 | 6/2016 | |
| EP | 3 339 139 A1 | 6/2018 | |
| JP | 2014-233999 A | 12/2014 | |
| KR | 20150042632 A | 4/2015 | |
| WO | WO 2014/017961 A1 | 1/2014 | |

* cited by examiner

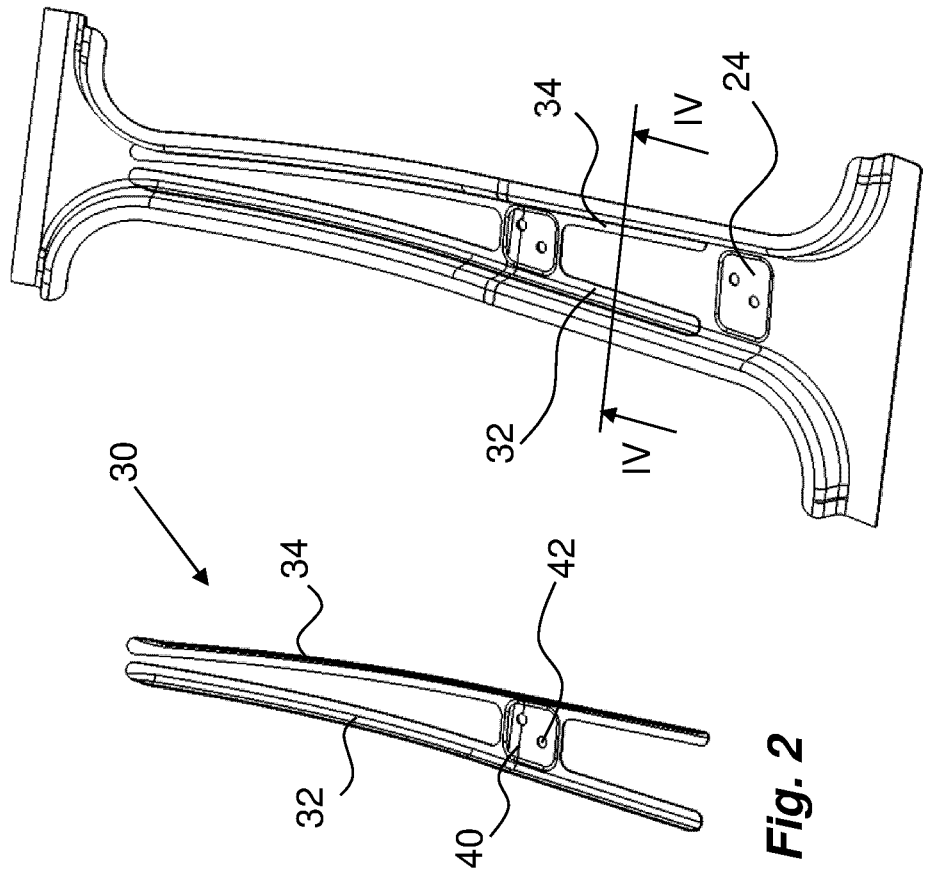
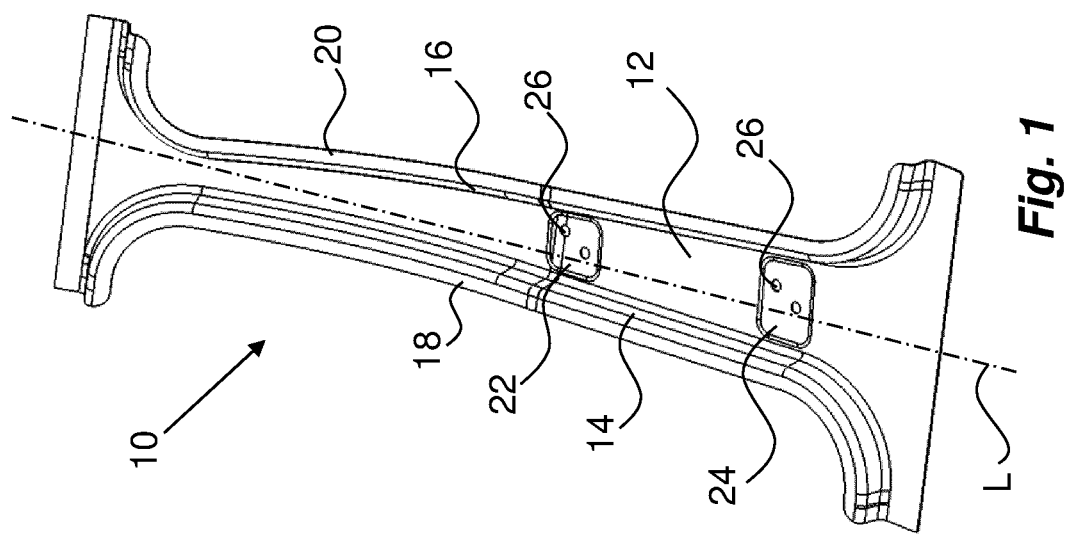

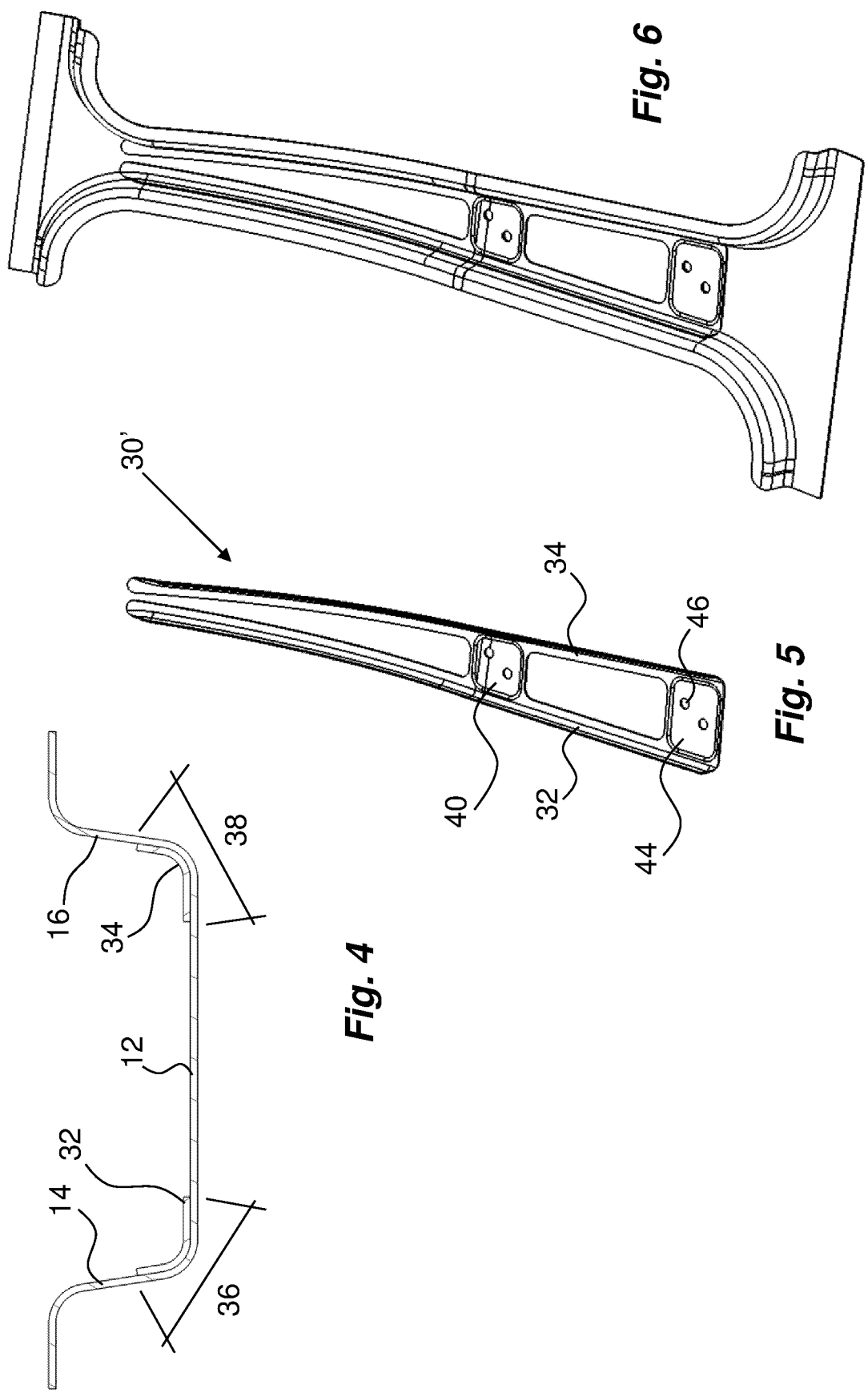

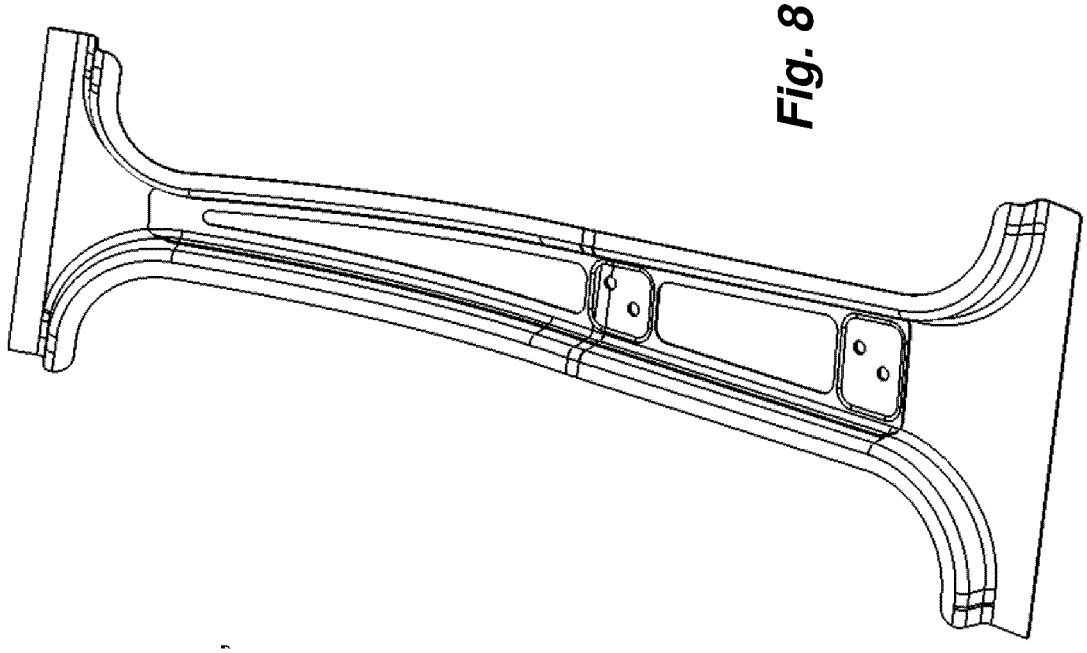
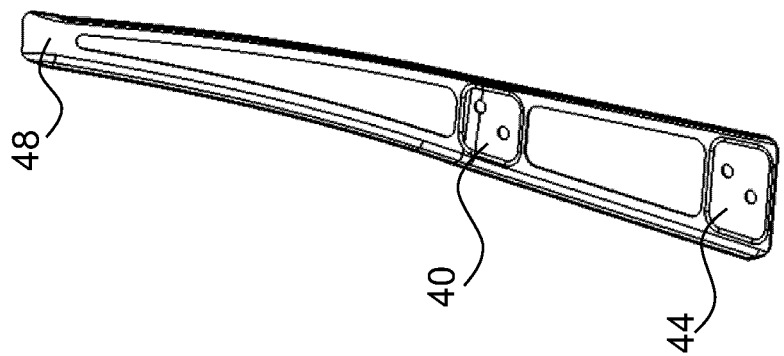

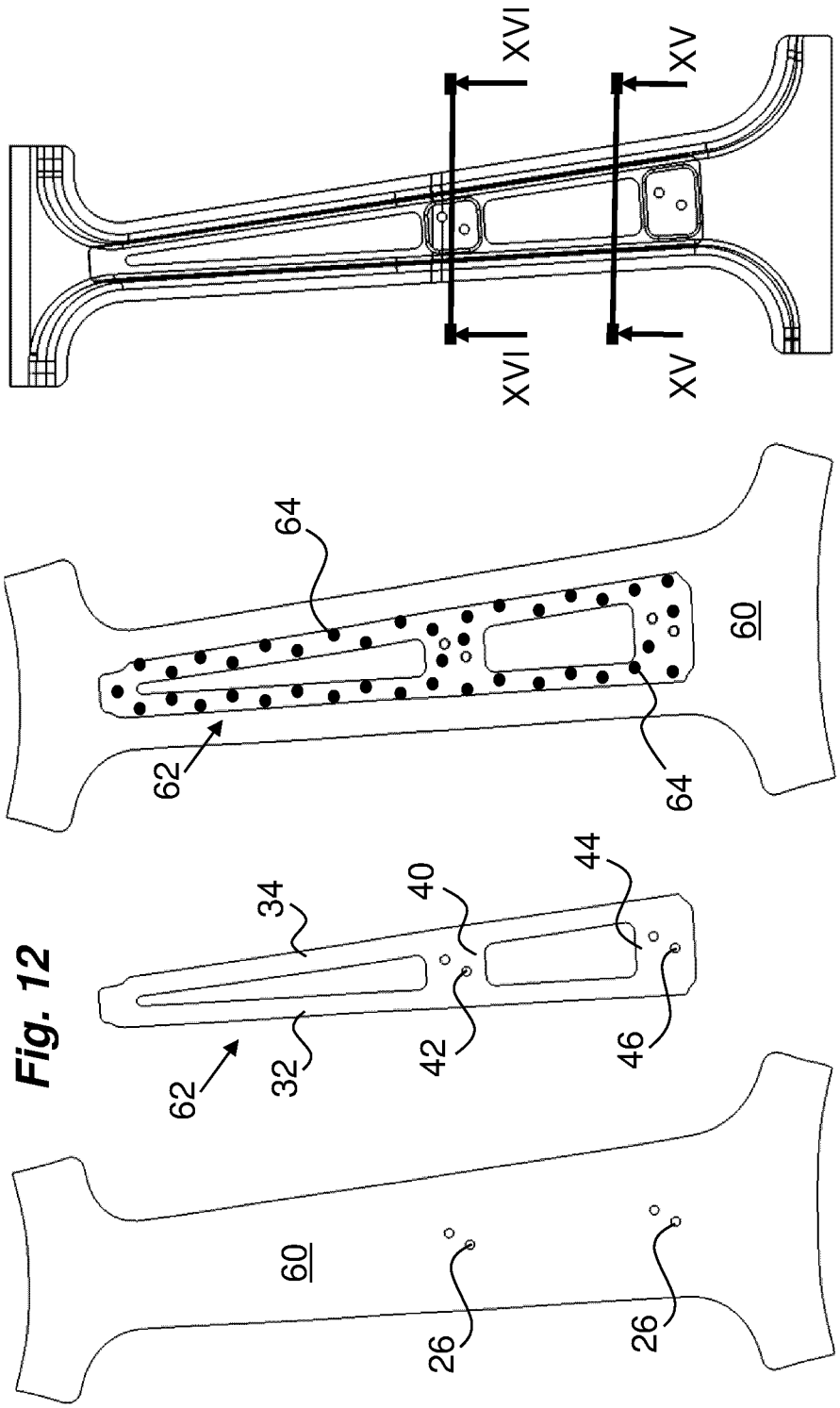

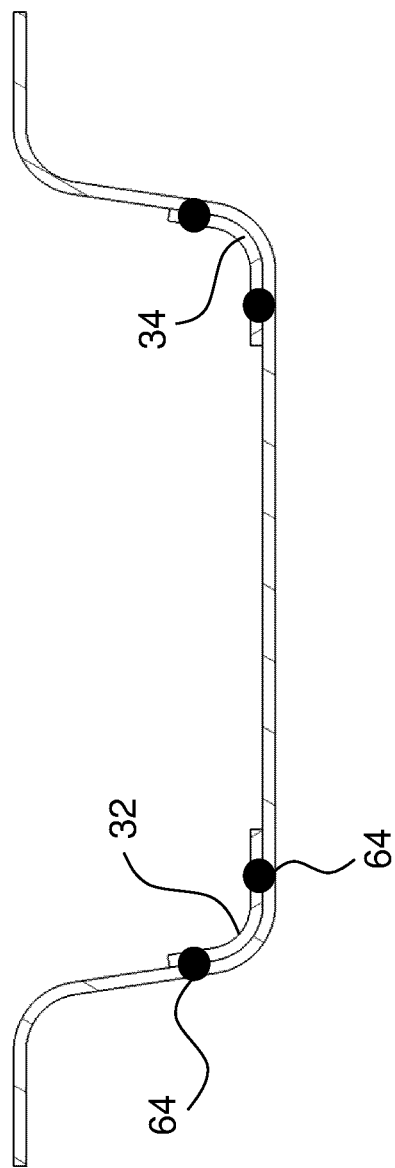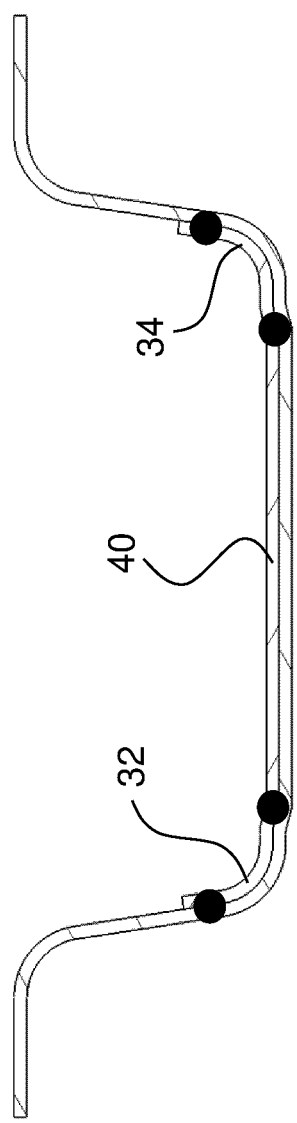

CORNER PATCH

TECHNICAL AREA

The present invention relates to a reinforcement element for a pillar for a vehicle and in particular a so-called B-pillar forming a part of the body of a motor vehicle such as a car.

BACKGROUND OF INVENTION

The pillars of motor vehicles are required to withstand high strain such as during a collision. Modern designs comprise pillars that are reinforced by adding material to certain areas along the extension. For example, it is known to place sheet metal reinforcements on a sheet metal blank, weld them together and then form a pillar by hot forming and hardening in a press hardening process. This is for instance known from WO2014/017961. Here a reinforcement plate is attached to a plate blank for forming a B-pillar. The reinforcement plate has a design such that at least ¼ of its length has a width corresponding to the hat profile of the B-pillar and then narrows down at both its ends, whereby it is not extending the full width. With this design, good collision performance is obtained at the same time as the weight is reduced in comparison if the reinforcement plate had the full width throughout its entire length. However, in many instances, there is a desire to reduce the weight even further, without compromising the strain handling performance of the pillar.

An alternative is shown in document EP 2617509. Here reinforcement members are formed so as to cover only ridge portions of the pillars. The reinforcement members are preferably attached before the pillar is formed. A drawback with this solution is that a number of loose reinforcement members have to be handled and placed on a base member or blank in order to be attached by e.g. welding. From a view of mass-production, this is not optimal since it requires multiple fixtures or clamping members that hold a plurality of reinforcement members during attachment. There is thus room for improvement in this area.

BRIEF DESCRIPTION OF INVENTION

The aim of the present invention is to remedy the drawbacks of the state of the art designs. The aim is solved by a B-pillar according to the features of claim 1. Preferable embodiments form the subject of the dependent patent claims.

According to a main aspect, a reinforcement element is provided, which is arranged to be attached to a profile for forming a B-pillar for a vehicle, where the profile is arranged with attachment areas for door hinges. Preferably the reinforcement element is designed with two elongated strips of material, wherein the strips are inter-connected at least at one attachment area for door hinges when the reinforcement plate is attached to profile. In this manner, it is easy to handle the attachment of the strips to the profile even if they are discrete elongated member, because they are attached to each other, forming one single component. A further advantage is that the interconnection is positioned at an attachment area for a door hinge, providing a reinforcement aspect at an area that is exposed to forces when a door is handled.

According to one aspect, the strips may be interconnected at an attachment area of an upper door hinge. This is an advantage in that the upper hinge of a vehicle door may be exposed to rather high forces if a load is applied to an outer end of the door, for instance if a person is hanging on the upper edge of the door. As an alternative or in addition, the strips may be interconnected at an attachment area of a lower door hinge. Especially strengthening both attachment areas may be advantageous for a door attachment.

It is of course possible to have a reinforcement element where the strips further are interconnected at an upper end thereof and/or at a lower end thereof, and in this aspect the strips may be interconnected at several places along the extension of the strips, especially if the strips are long in relation to their respective widths.

According to a further aspect of the present application, the profile is hat-shaped with a central flange and two sides, and each strip may be attached to the transition area between the central flange and a side. Thus, the reinforcement is located at corners of the profile and as an additional feature, each strip may extend laterally a distance on the central flange and a distance on the side. The extension of the strips laterally may thus be chosen and adjusted in order to obtain the desired and required strength properties. Preferably the strips may be attached on an inner transition area of the profile.

According to a further aspect of the application, a method of manufacturing a B-pillar having a reinforcement element as described may be provided comprising forming a blank in a plane plate, attaching the reinforcement element to said blank and press hardening the blank and the reinforcement element into a desired shape. In order to attach the reinforcement element, it may be spot welded to the profile. In this regard, the reinforcement element may be spot welded to the profile at least at the transition areas between the central flange and the sides.

An alternative method may also be provided comprising the steps of forming a blank in a plane plate; forming a reinforcement element in a prepreg fibre reinforced polymer material; heating the blank to an austenite temperature so as to form austenite in the blank; forming the blank to a desired shape, cooling the blank to a temperature below 500° C., applying the reinforcement element to said formed blank, pressing the reinforcement element into adhesion to the formed blank, and at least partly curing said reinforcement element.

According to the alternative method, the step of forming the blank to a desired shape may be performed inside a forming tool, and wherein the step of applying the reinforcement element to the formed blank is performed in a pressing tool different from the forming tool.

These and other aspects of, and advantages with, the present invention will become apparent from the following detailed description of the invention and from the accompanying drawings.

BRIEF DESCRIPTION OF DRAWINGS

In the following detailed description of the invention, reference will be made to the accompanying drawings, of which FIG. 1 shows a perspective view of a profile for a B-pillar of a vehicle, FIG. 2 shows a perspective view of a reinforcement element according to a first embodiment of the present invention, FIG. 3 shows a perspective view of a B-pillar comprising the profile of FIG. 1 and the reinforcement element of FIG. 2, FIG. 4 shows a cross-section taken along the line IV-IV of FIG. 3, FIG. 5 shows a perspective view of a reinforcement element according to a second embodiment of the present invention, FIG. 6 shows a perspective view of a B-pillar comprising the profile of FIG. 1 and the reinforcement element of FIG. 5, FIG. 7 shows a perspective view of a reinforcement element according to a third embodiment of the present invention, FIG. 8 shows a perspective view of a B-pillar comprising the profile of FIG. 1 and the reinforcement element of FIG. 7, FIG. 11 shows a side view of a plane profile blank to be formed as the profile of FIG. 1, FIG. 12 shows a side view of a reinforcement element as a plain blank, FIG. 13 shows a side view of the reinforcement element spot welded to the profile blank, FIG. 14 shows the B-pillar formed by the joined blanks of FIG. 13, FIG. 15 shows a cross-section of the B-pillar of FIG. 14 taken along the line XV-XV, and FIG. 16 shows a cross-section of the B-pillar of FIG. 14 taken along the line XVI-XVI.

DETAILED DESCRIPTION OF THE INVENTION

Figure 10:
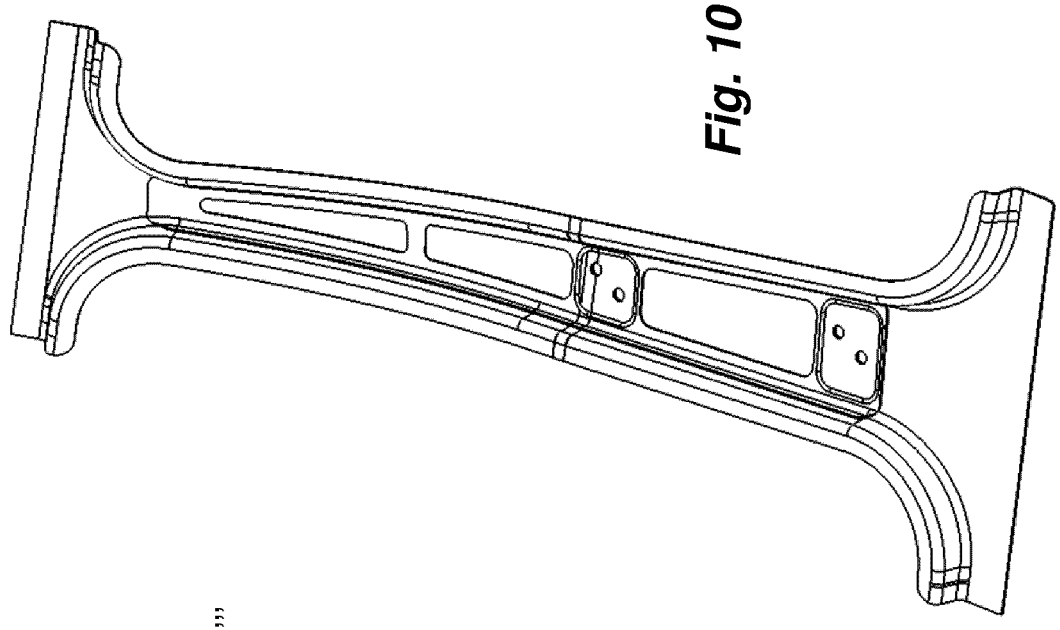
FIG. 10 shows a perspective view of a B-pillar comprising the profile of FIG. 1 and the reinforcement element of FIG. 9.

FIG. 1 shows a profile 10 comprised in a B-pillar of a vehicle. The profile 10 extends in a longitudinal direction L and is generally hat-shaped with a central flange 12 and two sides 14, 16. The sides 14, 16 each has outwardly directed flanges 18, 20 as seen in a longitudinal direction of the profile. The profile is further arranged with attachment areas 22, 24 for door hinges, for example upper and lower door hinges of a rear door of a car. The attachment areas 22, 24 may be arranged with fastening elements such as holes 26 for attachment bolts for the hinges. It is however to be understood that there might be other types of fastening elements and more than two attachment areas along the extension of the profile.

In order to enhance the strength of the profile 10 and to provide it with desired handling characteristics of impact forces without undue addition of weight to the finished B-pillar, a reinforcement element 30 is attached to the profile 10. In the first embodiment shown in FIGS. 2 and 3, the reinforcement element 30 comprises two elongated strips 32, 34. The strips 32, 34 are designed such and have such a distance between them that they will cover at least transition areas 36, 38 between the central flange and the sides, see FIG. 4, such that one strip 32 covers one transition area 36 between the central flange 12 and one side 14 and the other strip 34 covers another transition area 38 between the central flange 12 and the other side 16. Thus, with this solution, there will be a central area of the central flange 12 that is uncovered by the reinforcement element. However, the two strips 32, 34 are interconnected at least in one position. This is on the one hand for easier handling of the reinforcement element when attaching it to the profile as will be explained and on the other hand for strengthening at least one specific area.

According to a preferable first embodiment shown in FIGS. 2 and 3, the specific area to strengthen further is the attachment area 22 for the upper door hinge which may be exposed to high forces if for instance the attached door is exposed to downwardly directed forces at the free end of the door, which may occur if a person is hanging on an upper outer edge of the door. As seen in FIG. 2 the reinforcement element 30 is provided with a bridging component 40 between the strips 32, 34, which bridging component 40 generally has the same extension as seen in the longitudinal direction as the attachment area 22 for an upper door hinge and will be positioned covering the attachment area 22. Further the bridging component 40 may be provided with fastening elements 42 of the same type of and same orientation as the attachment area such that the bridging component 40 may be provided with the same type of holes having the same orientation as the holes of the attachment area 22 of the profile 10. As seen in FIG. 3, the strips 32,34 of the first embodiment will end above the attachment area for the lower hinge when the reinforcement element 30 is attached to the profile 10, forming a B-pillar.

A second embodiment of a reinforcement element 30' is shown in FIGS. 5-6. Here the strips 32, 34 of the reinforcement element 30', apart from the first bridging component, are interconnected at a lower end thereof with a second bridging component 44, which second bridging component 44 is arranged to cover the lower attachment area 24 for a lower door hinge. Also here the second bridging component 44 is preferably provided with fastening elements 46 of the same type and orientation as the fastening elements 26 of the attachment area 24 of the lower door hinge in the profile 10. With this solution, both attachment areas 22, 24 for door hinges are reinforced by the reinforcement element as seen in FIG. 6.

Figure 9:
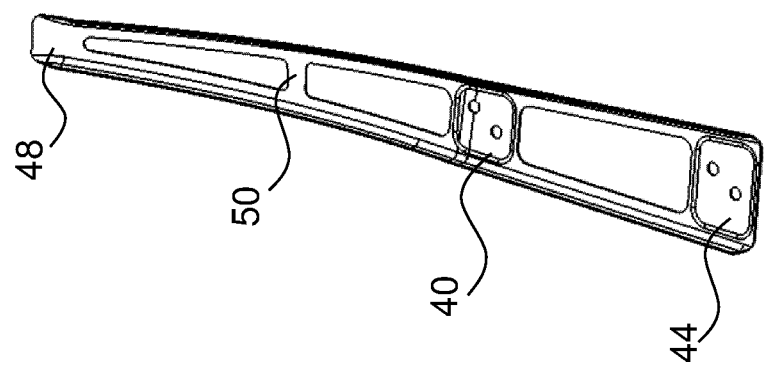
FIG. 9 shows a perspective view of a reinforcement element according to a fourth embodiment of the present invention.

In order to further enhance and/or customize the strength and deformation resistance properties of the B-pillar, the reinforcement element may be provided with further bridging components. A third embodiment of a reinforcement element 30" is shown in FIGS. 7-8. Here the strips 32, 34, apart from the previously mentioned bridging components 40, 44, have been provided with a bridging component 48 at the upper ends of that interconnects the upper ends of the strips 32, 34. In this respect, a fourth embodiment of a reinforcement element 30'" is shown in FIG. 9-10. As an additional feature or as an alternative feature, the reinforcement element 30'" may be provided with a bridging component 50 positioned between the upper ends of the strips 32, 34 and the bridging component 40 for the upper door hinge.

FIGS. 11-14 show a possible method of manufacturing a B-pillar with the reinforcement element according to the invention. As an example, the profile is formed as a plane blank 60 and is provided with a predetermined contour shape and possibly provided with fastening elements such as holes 26 for attachment bolts. The reinforcement element is also formed as a plane blank 62 with the desired contour shape of the strips and with the desired amount and position of the bridging components. The bridging component may also possibly be provided with fastening elements 42, 46, that preferably have the same orientation as the fastening elements 26 of the profile. The reinforcement element blank 62 is then fixated to a surface of the profile blank 60 with certain predetermined orientation relative each other and the reinforcement element blank 62 is attached to the profile blank 60. This may be done in a preferred way with a plurality of spot welds 64 between the reinforcement element blank to the profile blank as seen in FIG. 13. The positions of the spot welds 64 may preferably be chosen in certain patterns as will be described below.

The welded blanks are now to be formed to a B-pillar. This is done according to one preferable solution where the B-pillar is thermoformed and hardened with press hardening technology wherein the blanks are heated to austenite temperature and are formed in a cooled-down tool pair. Here the B-pillar formed by the profile and the reinforcement element rest and are hardened together with the tool as a fixture. The produced B-pillar is provided with a reinforcement element 30 with its strips 32, 34 placed in certain relation to the profile 10. As seen in the cross-sectional view of FIG. 15, the strips cover at least the transition areas between the central flange and the sides. Preferably the strips extend some distance into the central flange and up the side. Further, as seen in the figure, the spot welds 64 are preferably placed at the outer sectors of the transition areas when the B-pillar has been thermo-formed in order to provide a secure attachment of the reinforcement element to the profile. In the cross-sectional view of FIG. 15, the spot welds on the inner and the outer sectors of the strip around the transition area are in the same transversal plane. It is however to be understood that the spot welds may be positioned offset in the longitudinal direction of the strips as indicated in FIG. 13, forming a sort of zig-zag-pattern of spot welds. Further spot welds may be placed in the bridging areas and in particular adjacent the attachment elements.

As an alternative to the above method of producing a B-pillar with the reinforcement element according to the invention, only the profile may be thermo-formed as described above. In addition, the reinforcement element may be produced as a prepreg fibre reinforced polymer patch, where the fibres preferably comprise carbon fibres. With this method the formed and still hot profile is placed in a specific forming tool. In parallel to the forming of the profile, the fibre reinforced polymer reinforcement element is provided in an un-cured, prepreg condition. Then the reinforcement element is heated and joined with the hot profile in the forming tool wherein the reinforcement element is cured and attached to the profile by pressing into adhesion with the pressing tool. The heating of the reinforcement element may be performed in the pressing tool by the hot profile and/or by adding heat. The heat in the pressing tool should in any event be below 500 degrees C. for the curing of the reinforcement element but preferably above 150 degrees C.

It is to be understood that the embodiment described above and shown in the drawings is to be regarded only as a non-limiting example of the invention band that it may be modified in many ways within the scope of the patent claims.

The invention claimed is:

1. A B-pillar for a vehicle, the B-pillar comprising:
a profile, and
a reinforcement element attached to the profile for forming the B-pillar,
wherein the profile comprises attachment areas for door hinges, wherein the reinforcement element is designed with and comprises two elongated strips of material, wherein the elongated strips are interconnected at least at one of the attachment areas for door hinges,
wherein the profile is hat-shaped with a central flange and two sides, and
wherein each elongated strip is attached to an inner transition area of the profile between the central flange and one of the two sides.

2. A B-pillar according to claim 1, wherein the elongated strips are interconnected at one of the attachment areas of an upper door hinge.

3. A B-pillar according to claim 1, wherein the elongated strips are interconnected at one of the attachment areas of a lower door hinge.

4. A B-pillar according to claim 1, wherein the elongated strips are interconnected at an upper end thereof and/or at a lower end thereof.

5. A B-pillar according to claim 1, wherein the elongated strips are interconnected at several places along the extension of the elongated strips.

6. A B-pillar according to claim 5, wherein each elongated strip extends laterally a distance on the central flange and a distance on one of the two sides.

7. A method of manufacturing a B-pillar according to claim 1, by:
forming a blank in a plane plate,
attaching the reinforcement element to said blank, and
press hardening the blank and the reinforcement element into a desired shape.

8. A method according to claim 7, wherein the reinforcement element is spot welded to the profile.

9. A B-pillar manufactured according to claim 8, wherein the reinforcement element is spot welded to the profile at least at the inner transition areas between the central flange and the sides.

10. A method according to claim 8, comprising the steps of:
forming a blank in a plane plate;
forming the reinforcement element in a prepreg fibre reinforced polymer material;
heating the blank to an austenite temperature so as to form austenite in the blank;
forming the blank to a desired shape,
cooling the blank to a temperature below 500° C.,
applying the reinforcement element to said formed blank; and,
pressing the reinforcement element into adhesion to the formed blank, and at least partly curing said reinforcement element.

11. A method according to claim 10, wherein the step of forming the blank to a desired shape is performed inside a forming tool, and wherein the step of applying the reinforcement element to the formed blank is performed in a pressing tool different from said forming tool.

* * * * *